3,464,319
REDUNDANT CONTROL MECHANISM
Robert Sherman and George M. Babic, West Hartford, Conn., and Hernan A. Posnansky, Huntsville, Ala., assignors to United Aircraft Corporation, East Hartford, Conn., a corporation of Delaware
Filed Nov. 29, 1967, Ser. No. 686,658
Int. Cl. F01b 25/26; F15b 15/26, 9/02
U.S. Cl. 91—411                                    14 Claims

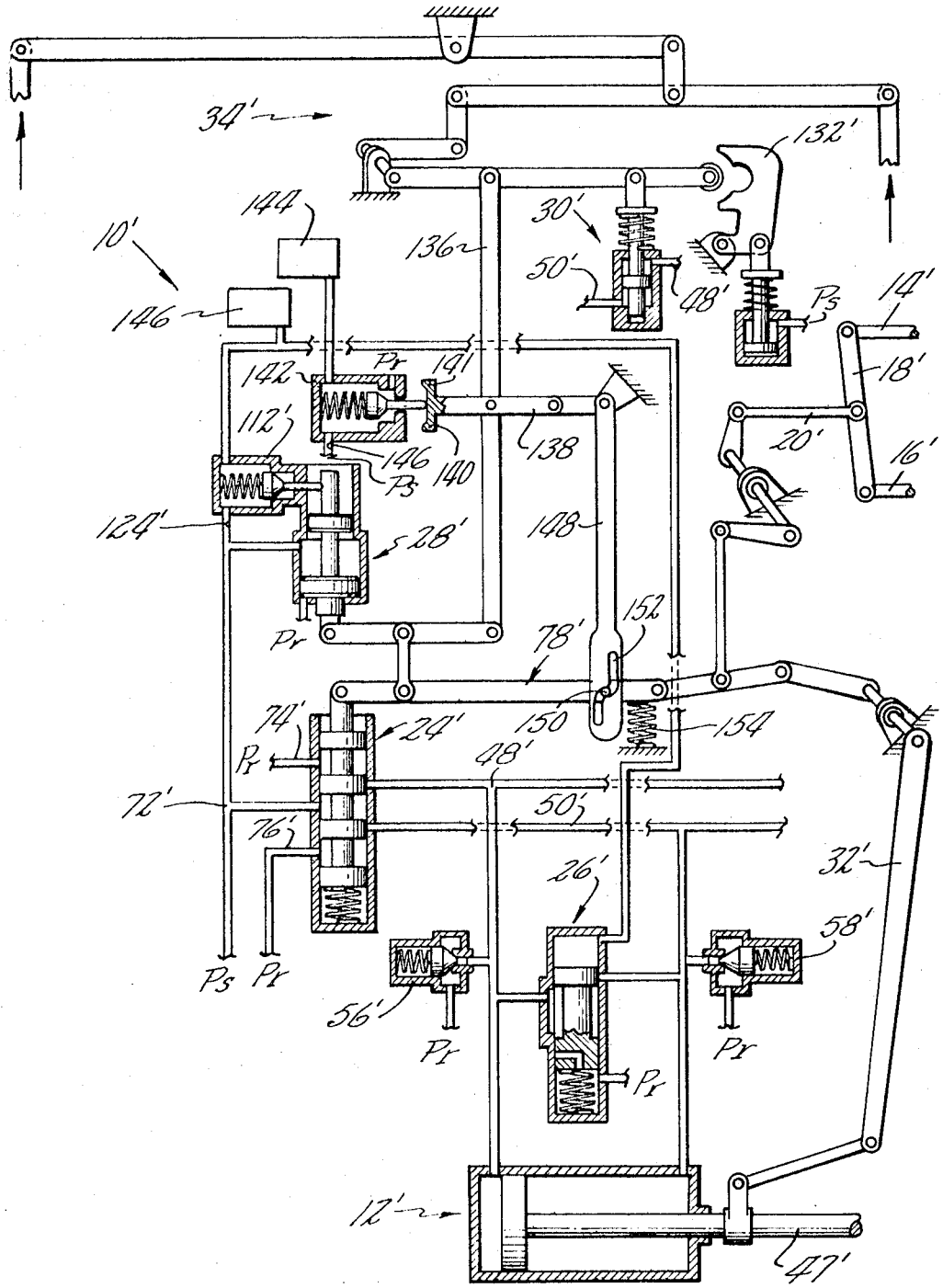

ABSTRACT OF THE DISCLOSURE

This invention relates to redundant servo actuators which may be ganged to operate a common control in parallel with the control load shared among the actuators. Each actuator has provisions for failure detection. If an actuator should fail, it may be rendered passive and the control mechanism stays operational with the remaining operative actuators.

BACKGROUND OF THE INVENTION

This invention relates to redundant servo mechanism which includes provisions for load sharing among the redundant channels and self-detection of failures in errant channels. The application is related generally to application Ser. No. 686,659, filed Nov. 29, 1967, by H. Nordholm, having the same assignee.

Much art has recently emerged in the field of redundant servo mechanisms, especially in aircraft control systems, due to emphasis on safety. In some approaches, partially redundant systems include a plurality of fluid control valves in which the fluids from the respective control valves feed a common fluid motor. Such systems are shown in U.S. Patents Nos. 3,219,295 and 3,257,911. These systems provide a limited degree of redundancy and rely upon an averaging of the command signals driving the fluid actuator to avoid complete failure. In more sophisticated redundant servo mechanisms, full redundancy exists by duplicating both the fluid control valves and fluid motor as shown in U.S. Patent No. 3,270,623. In these systems, an additional feature is often included which permits self-determination of a malfunction and switching from the active channel to a standby channel. These systems are referred to sometimes as "on-off" systems in view of the fact that during normal operation one of the channels is "on" and the other of the channels is "off." The criteria for failure is usually an arbitrary control condition which would not normally exist in the absence of a failure, e.g., a high control pressure.

Still other systems such as shown in U.S. Patents Nos. 3,338,138 and 3,338,139 operate in "on-on" which means that a number of the redundant, parallel channels operate simultaneously. With such systems, however, it is desirable to incorporate some means for sharing the loads between the active channels so that one of the servos is not overloaded. Maximum response is derived from all of the active channels operating cooperatively.

SUMMARY OF THE INVENTION

It is desirable to have a redundant servo mechanism in which the load can be shared at all times in equal proportions among the active channels of the redundant mechanism. This is accomplished in the present application by means of a balancing linkage which provides an error signal back to each of the individual channels to correct any load deviations from the average of the loads carried by all of the active channels. This insures that each channel will be operating with maximum response in cooperation with the rest of the channels.

It is also desirable where a plurality of redundant channels exists to have a failure detection apparatus incorporated within each channel so that an errant channel can be recognized and operatively removed from the system. An errant actuator even though shut off may interfere with the performance of the rest of the channels. In one embodiment of this invention, error is detected by an abnormal control condition in the errant channel. A pressure in the power actuator in excess of the system pressure or a design chip shearing force at the control valve is used for failure indication. If desired, the output of the errant channel can be automatically disengaged through a bypass valve and the input members can be disengaged by a collapsible linkage. In another embodiment of the invention, the error detection means is associated with the load sharing apparatus and the failure criterion is an excessive deviation of the errant channel from the mean or average control load carried by the operating channels. Using the average load for failure detection normally requires at least three operative channels to derive a reliable average from which the failed channel can be discerned. This is called a majority logic system.

Once a failed channel has been eliminated from the servo mechanism in this invention, it becomes necessary to lock up the input to the load sharing linkage to allow the remaining channels to continue load sharing. For this purpose, a lock is incorporated in each of the channels. The lock can be engaged with or disengaged from the load sharing linkage as a function of the operation of that channel.

An additional feature in the failure detection apparatus of one embodiment is a polarity input from the command member of the servo. In contrast to earlier majority logic systems, this input permits two operative channels alone to continue load sharing after a third channel has failed. This input provides the third quantity for determining which one of the two operative channels has failed when the load differential exceeds a prescribed tolerance. The failure criteria is that the one of the two channels which responds the least to the command member will be shut off to allow the single remaining channel to continue operation.

BRIEF DESCRIPTION OF THE DRAWINGS

FIG. 3 is an alternate embodiment of the servo actuator in FIG. 2. This view of the actuator also includes the power boost cylinder.

DESCRIPTION OF THE PREFERRED EMBODIMENT

Figure 1:
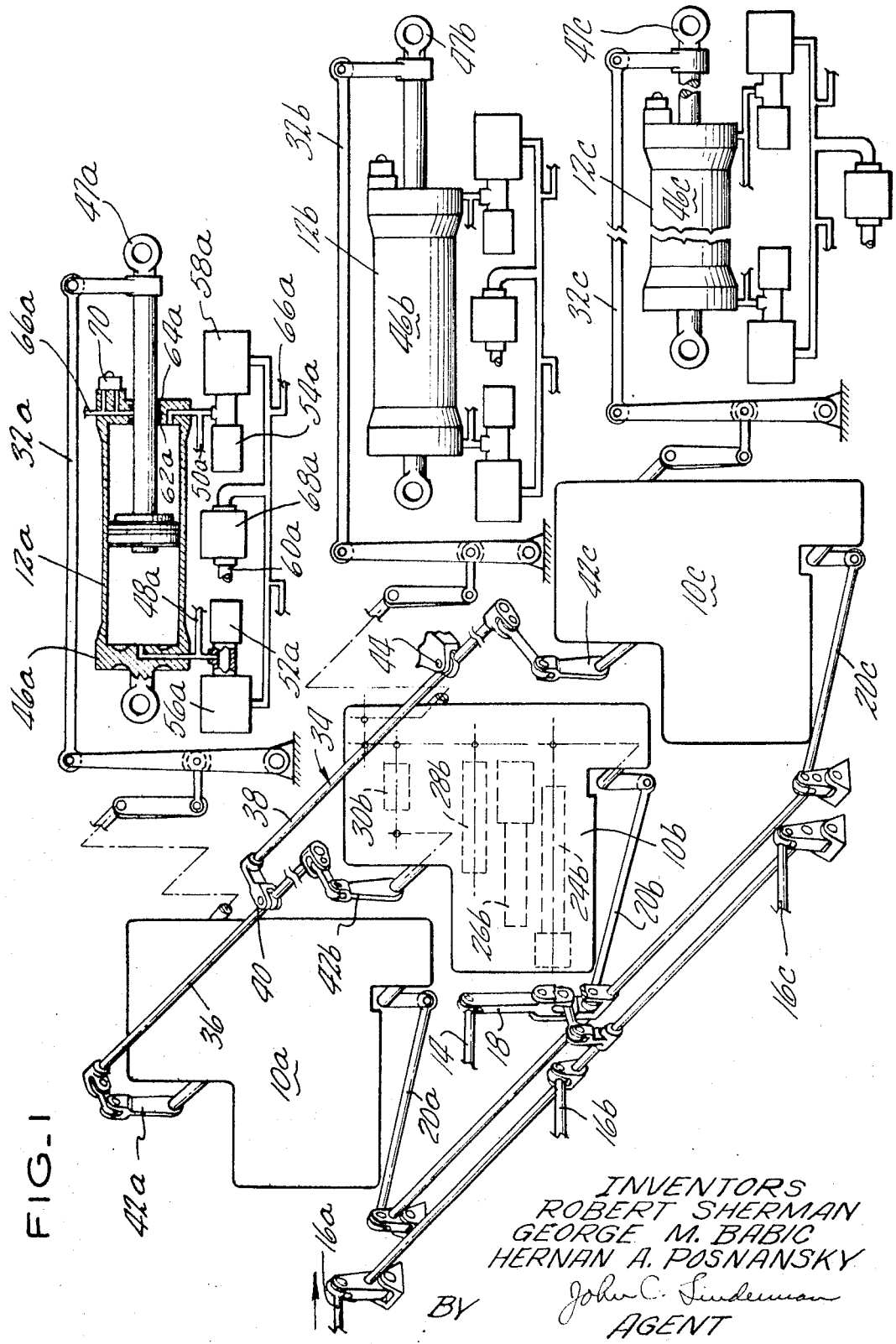
FIG. 1 shows three redundant control channels, including servo actuators and power boost cylinders, connected in parallel, and the interconnecting load sharing linkage.

Reference to FIG. 1 discloses a typical configuration of a plurality of redundant servo mechanisms operating in parallel. While the servo mechanisms may be employed in any control system where redundancy is desired, the embodiments will be described with respect to a power-boosted control system of an aircraft. Each of the channels of the servo mechanism has the same components consisting primarily of a servo actuator 10 and a power boost cylinder 12. Corresponding components in different channels will be distinguished by subscripts $a$ relating to channel A, $b$ to channel B, etc. The inputs to the control mechanism may come from a pilot's control 14 and stability augmentation system outputs 16. These inputs are combined through a differential linkage 18 and introduced into the servo actuator 10 by means of the triplicated input linkage 20. If desired, however, separation of the channels can be maintained at the input by connecting the respective linkages 20 individually to the outputs 16.

The servo actuators are hydraulic actuators which translate the input command signals and various feedback, and error signals into a fluid control valve generally designated 24, which controls the flow of pressurized hydraulic fluid to the power boost cylinder 12. In addition, the servo actuator includes a bypass valve 26, a chip detector 28 and a load transducer 30 which will be described in more detail with respect to FIG. 2. Other inputs to the servo actuator include a position feedback signal derived from the power boost cylinder through the feedback linkage 32.

Interconnecting each of the load transducers 30 in the three channels is a balanceable load sharing linkage 34. The load sharing linkage consists primarily of two whiffletrees 36 and 38. Whiffletree 36 is pivotally mounted at 40 on one end of whiffletree 38 and the lengths of the whiffletree 36 (shown broken away) between the pivot point 40 and the connections to each of the input arms 42a and 42b at the actuators are equal. Therefore, if the load transducers of each actuator are producing equal loads, the whiffletree will be balanced and springs within each actuator will bias the linkage to a centered position corresponding with the balanced condition. Any deviation from the balanced condition due to an equality of the loads produced by the load transducer will result in a displacement of the whiffletree 36 in proportion to the deviation of the loads.

The whiffletree 38 is pivotally mounted on a hard point 44 fixed with respect to the servo actuators 10. The length of the whiffletree 38 (also broken away) from hard point 44 to the input arm 42c is twice as long as the length of whiffletree 38 from point 44 to the pivot point 40. With the ratios of the whiffletrees established in this manner, a load from the transducer in servo actuator 10c will balance the whiffletree 38 against equivalent loads applied by the load transducers in servo actuators 42a and 42b. Again, a spring in the servo actuator 42c will bias the whiffletree 38 in the balanced condition to a centered position. Any deviation of the loads measured in the servo actuators will result in displacement of the load sharing linkage 34 in direct proportion to the amount of the load deviation of the respective actuators. The relationship of the load transducers with the loads carried by the power boost cylinder will be explained in further detail with respect to FIG. 2.

The power boost cylinder 12 is basically a hydraulic motor consisting of a fixed cylinder 46 and a movable output piston 47. Each of the output pistons 47 would be connected to a common movable contral surface so that the servo channels will be ganged together. With such arrangement, the servo channels are set to operate in parallel. Fluid controlled by the servo actuator 10 is supplied to each end of the cylinder 46 by control pressure ports 48 and 50. Connected with the pressure ports 48 and 50 at each end of the cylinder 46 are pressure switches 52 and 54, respectively. These switches are set to close an electrical circuit at a prescribed pressure which would not be produced in normal operation unless a malfunction had occurred in the channel. For example, if the maximum supply pressure to the channel is 3,000 p.s.i., the pressure switches would be closed at preselected tolerance above 3,000 p.s.i., for example 3,400 p.s.i. The tolerance of 400 p.s.i. would permit the system to operate with all three power cylinders without producing a failure signal at normal deviations of the output loads. A pressure in excess of the 3,400 p.s.i. in channel A would only be produced when the power cylinders in channels B and C were opposing the operation of the power cylinder in channel A. The failure signals produced by the pressure switches could be transmitted to the pilot or used to automatically shut off hydraulic power to the errant channel.

Also connected in common with the control pressure ports 48 and 50 are pressure relief valves 56 and 58, respectively. These valves are set to relieve high pressures in the cylinder 46 to the return line 60 of the hydraulic system in the event that a failure occurs and the pressure in the cylinders exceeds a safe design limit. Since the pressure switches 52 and 54 are actuated at a given failure pressure, the pressure relief valves must be set to relieve cylinder pressures no less than the given failure pressure. For example, if the pressure switches close at 3,400 p.s.i., an appropriate setting for the relief valves would be 3,500 p.s.i.

As an additional safety feature, double seals 62 and 64 prevent hydraulic fluid from escaping from the cylinder 46. Positioned between these seals is a drain line 66 which is connected to the return line 60 through a check valve 68. Interposed in this line is a leak detector 70 which has an orifice positioned in the drain line. The leak detector 70 recognizes a pressure differential across the orifice when the inner seal 62 has broken and fluid flows through line 66 to the return line 60. The leak detector could transmit a signal to the pilot or provide a visual indication at the cylinder that the seal has failed, while the outer seal 64 would continue to confine the fluid within the hydraulic system. In the event that the outer seal 64 should fail, the check valve 68 prevents any fluid in the return line 60 from dumping overboard.

Figure 2:
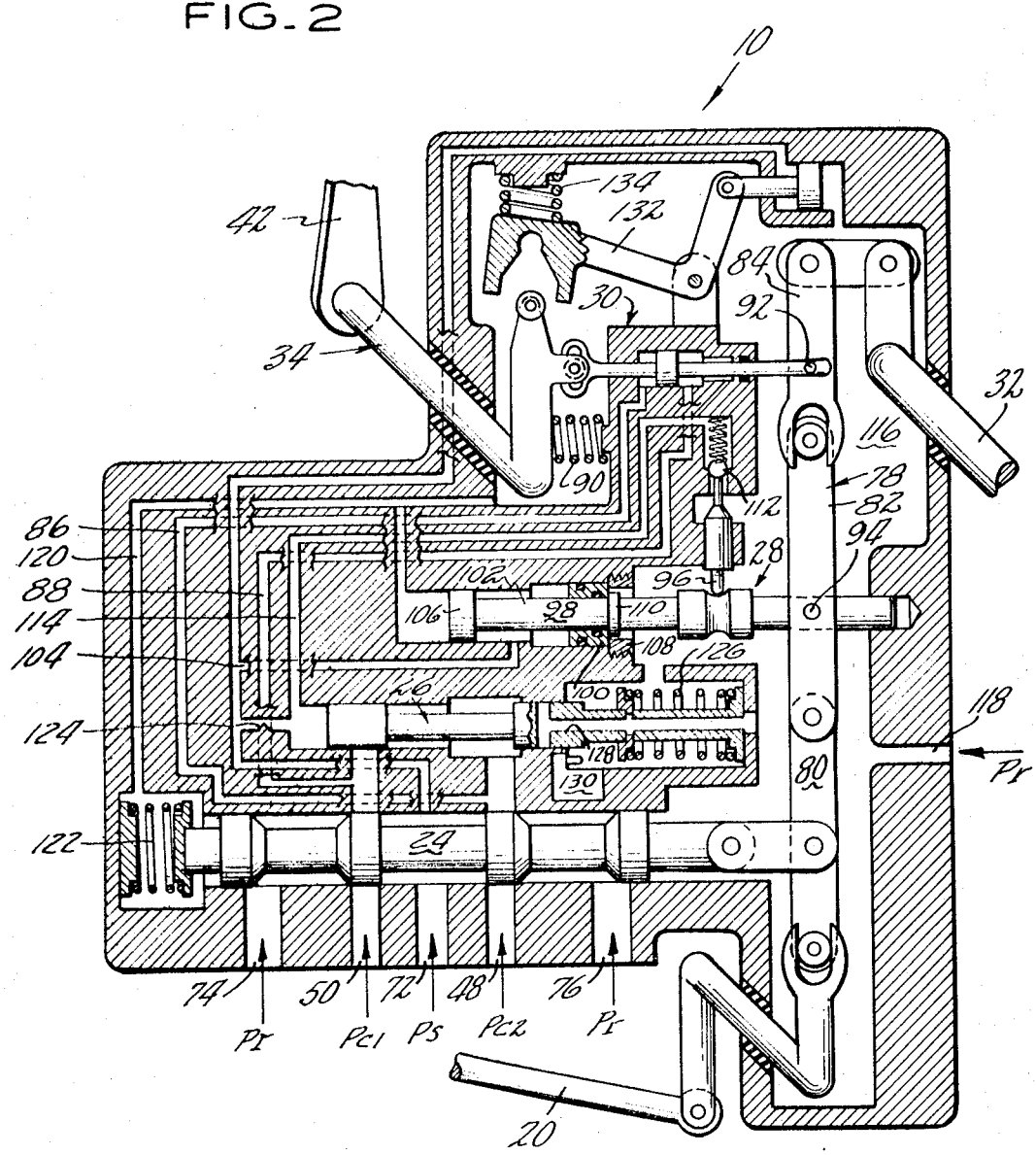
FIG. 2 is a detailed view of one of the servo actuators shown in the redundant control channels of FIG. 1.

Reference to FIG. 2 discloses the details of the servo actuator 10. The primary function of the servo actuator is the metering of pressurized hydraulic fluid to the power cylinder in response to the various command and error signals provided to the actuator. A supply pressure $P_s$ from a pressurized fluid source is introduced to the actuator 10 at pressure port 72. For full redundancy, separate fluid pumps for each channel are preferred. Hydraulic fluid leaves the actuator at return pressure $P_r$ by ports 74 or 76. Control pressures $P_{c1}$ and $P_{c2}$ are produced by the actuator at the control pressure ports 48 and 50 leading to the cylinder 46 shown in FIG. 1. The metering of the hydraulic fluid to the control ports 48 and 50 is performed by the control valve 24 which may be a flow compensated spool valve. The operation of the valve 24 is controlled by the three inputs to the servo actuator, the command signal introduced by the input linkage 20, the feedback linkage 32 and the load sharing linkage 34. These signals are mechanically added in a differential linkage 78 comprised of links 80, 82 and 84. The differential linkage 78 adds each of these signals so that the combined displacement of the control valve 24 is equal to the algebraic sum of the individual feedback, error or command inputs. In normal operation, the input command member 20 and the load sharing linkage 34 will displace the control valve 24 and, as the piston 47 in the power boost cylinder displaces an amount proportional to the combined command signals, the feedback linkage 32 will reposition the control valve 24 at its null condition. Any variations of this position due to external loads on the output piston 47 will automatically be communicated to the control valve 24 which will operate to hold the piston 47 in its control position.

LOAD SHARING

The load sharing error signal from the linkage 34 is introduced to the differential linkage 78 through the load transducer 30. The load transducer is composed of a piston and cylinder assembly, the piston having a pressure differential across it equal to the pressure differential across the piston 47 in the power boost cylinder 12. This pressure differential is supplied to the load transducer 30 from the pressure control ports 48 and 50 by means of conduits 86 and 88, respectively. When the loads on each of the power boost cylinders are equal, the pressure differentials in the load transducers 30 of each servo actuator will be the same and the load sharing linkage 34 together with the pistons in the load transducers 30 will be biased to the centered or balanced position by the springs 90 in each of the servo actuators 10. With the load sharing linkage in its centered position, the connecting pin 92 between the load transducer and link 84 will be in a normally centered position and will not provide any load sharing command to the control valve 24. Any deviation in the loads carried by the power boost cylinders 12, and therefore the load transducers 30, will be reflected in a proportional displacement of the connecting pin 92 due to the spring 90. Spring 90 also eliminates backlash in the load sharing linkage 34. It is significant to note that if two of the power cylinders, for example 12a and 12b in channel A and B respectively, are carrying the same load and the power cylinder 12c in channel C is carrying a slightly different load, the displacement of the load transducer 30c will be twice that of the displacement of the load transducer 30a and 30b and in the opposite direction. The effect, therefore, of the load sharing linkage is to correct the load of the channel having the greatest error by the greatest extent.

CHIP DETECTION

This embodiment of the servo actuator also includes specific provisions for detecting a chip within the control valve 24 and means for disengaging the inputs to the control valve 24 when the chip has jammed the valve operation. The chip detector 28 is comprised primarily of a collapsible linkage which is incorporated with the differential linkage 78 and is composed of link 82, connecting pin 94, a detent 96 and a load reacting and centering assembly 98. The assembly 98 includes a slidable piston 100 operating on a piston rod 102. Supply pressure from port 72 is introduced through conduit 104 to the assembly 98 between the slidable piston 100 and a piston 106 on the end of the rod 102. The slidable piston 100, being larger than the piston 106, is forced against an abutment 108. A flange 110 on the piston rod 102 will be held adjacent to the slidable piston 100 due to the force applied against piston 106. The piston rod 102 can therefore be place in a position controlled by the flange 110, piston 100 and abutment 108 which permits the detent 96 to be engaged. With the detent 96 engaged, poppet valve 112 will be closed and system pressue $P_s$ will hold the bypass valve 26 in its closed or right-hand position. With the pressure areas of pistons 100 and 106 having a ratio of 2:1, the connecting pin 94 will serve as a fulcrum and react loads operating the control valve 24. In the event that a chip becomes lodged in the valve 24, a continued application of force from the input command linkage 20, the load sharing linkage 34 or the feedback linkage 32 will cause the collapsible linkage to eventually yield at a preselected load. The load at which the linkage collapses will be the same regardless of its direction as long as the piston area ratio mentioned above is 2:1, and this load should be selected at the maximum chip shearing load which the weakest link in the servo actuator will support without bending or fracturing. This load is referred to as the design chip shearing force.

It should be recognized that the computing cavity 116 in which the input and error commands are summed on the differential linkage 78 is filled with hydraulic fluid held at a quiescent system return pressure by port 118. In order to balance the pressure differential across the spool of control valve 24, conduit 120 connects the pressure in computing cavity 116 to the one side of the valve spool. A backlash spring 122 also engages the same end of the spool to eliminate free play in the differential linkage 78.

When the poppet valve 112 is opened due to a jammed control valve 24, pressure holding the bypass valve 26 closed is reduced due to flow past orifice 124, into the computing cavity 116. Biasing spring 126 actuates the bypass valve 26 from the closed position to an open position in which pressures in each end of the cylinder are reduced to the return pressure in cavity 116 through an internal passageway 128. Microswitch 130 detects the opening of the bypass valve 26 and furnishes a failure signal to the pilot. The pilot may then shut off the hydraulic pressure to this actuator 10 and thereby permanently disengage the errant channel from the operative channels. It will be readily recognized that automatic actuation of the bypass valve 26 could be provided from the pressure switches 52 and 56 of FIG. 1 by an electrically actuated shutoff valve in the pressure supply port 72.

LOAD SHARING LOCK

When the errant channel has been permanently disengaged and the power cylinder is in bypass, the output member from the load transducer 30 to the balanceable load sharing linkage 34 must be restrained to operatively disengage the transducer 30 from the linkage 34 and permit the remaining channels to load share without slop at the connection to the errant channel. For this reason, a latch 132 is included within the actuator to lock the load sharing linkage at the input arm 42 in the centered position. When the actuator is operating, supply pressure from port 72 holds the latch 132 in the disengaged position against the force of the biasing spring 134.

ALTERNATE EMBODIMENT

Referring to FIG. 3, another embodiment of the invention is shown which includes the same principal components as the embodiment shown in FIG. 2. Components such as the control valve 24', the chip detector 28' and the load sharing linkage 34' carry primed numbers corresponding with the same elements shown in FIG. 2. The same functional relationship previously described exists with the primed components in this alternate embodiment.

The actuator in this case includes the power boost cylinder 12' with the feedback linkage 32' from the output piston 47'. Pressure switches connected to each end of the boost cylinder 12' have been eliminated and with them the failure criterion associated therewith.

FIRST FAILURE

The first failure criterion for this actuator is a deviation of the control load carried by the piston 47 by a prescribed tolerance from the average load carried by the output members.

A load sharing link 136 transmits the load error signal from the load sharing linkage 34' to the control valve 24'. As in the previous embodiment, the load sharing linkage 34' is displaced at the actuator by an amount proportional to the deviation of the control load from the average control load of the ganged channels. A failure detection lever 138 is pivotally connected to the link 136 and includes a pair of tangs 140 and 141 which operate a poppet valve 142 and a pressure switch 144. When the tangs 140 and 141 have translated with the link 136 by a preselected amount, proportional to the prescribed tolerance, the poppet valve will be opened and orifice 146 will reduce the pressure within the poppet valve 142 and actuate pressure switch 144. This pressure switch will provide the pilot with a failure signal indicating that this channel has fallen out of the prescribed tolerance. The pilot may then shut off hydraulic power to the actuator and thereby place the boost cylinder 12' in bypass through valve 26'.

It will be readily recognized that the channel can be automatically placed in bypass by connecting poppet valve 142 in series with poppet valve 112' so that either of the valves will automatically actuate bypass valve 26'. A second pressure switch 146 functionally replaces the microswitch 130 in FIG. 2 and would not be necessary in the event that poppet valves 112' and 142 were connected in series.

SECOND FAILURE

It is well known that in systems employing majority logic to detect failures, a comparison of three signals is necessary for failure discrimination. In order to provide the third input quantity for failure detection when only two of the actuators are operating, a slotted polarity reference lever 148, shown in FIG. 3, is connected between the input command linkage 20' and the failure detection link 138 through the differential linkage 78'. A pin 150 in the differential linkage 78' actuates the polarity reference lever 148 by means of the curved slot 152. The backlash spring 154 keeps the pin 150 engaged with the one side of the slot. The lever 148 in turn biases the link 138 and the tangs 140 and 141 slightly in one direction or the other depending upon the polarity or phase of the input command error signal, the polarity being established as a plus or minus displacement of the linkage 78' with respect to a centered or null position of the linkage 78' when no error exists. This displacement is controlled by the input command linkage 20' either directly or indirectly through the cooperation of the position feedback linkage 32' whose steady state position is effectively prescribed by the input linkage 20'.

The failure criterion upon which this bias is premised is that when the load error between the two operative channels exceeds the permissible tolerance, the failed channel which responds the least in phase, or the most out of phase, with the command input. Again, the error signal may be defined as the load deviation of a channel from the average of the two control loads. Inherently, the deviation of one channel will be above the average, designated positive, and the deviation of the other will be below the average, designated negative, by an equal amount.

It is important to recognize that the tangs 140 and 141 represent the upper and lower limits of the load tolerance. It is also important to recognize that the upper and lower limits alternate between the respective tangs with a change of polarity, or phase, of the input command, basically because the pressure differential across the piston 47' and the load transducer 30' reverses. The bias, provided by the polarity reference lever, effectively increases or extends the upper limit and decreases or reduces the lower limit of the prescribed load tolerance. Since the upper and lower limits alternate between the tanks in accordance with the polarity of the input command signal, the bias must reverse with the polarity of the input or shift the tangs in phase relationship with the input signal.

For example, if the pistons 47' in the two operative channels A and B have been commanded by the input members 20' to move to the right, (arbitrarily designated a positive command), the loads produced by the transducers 30' should be in a downward direction in each channel. If the load in channel A is less than the load in channel B, link 136 in channel A will move upward due to the unbalance of the load sharing linkage. In addition, however, the polarity reference levers 148 in both channels will have moved the lower tangs 140 on link 138 closer to the poppets and the upper tangs 141 away from the poppets by a corresponding amount. The load tolerance established by the tangs has therefore been biased by the motion of the polarity lever 148 and if the load deviation or error is large enough, the lower tang 140 in channel A will trip the poppet and indicate a failure of channel A before the upper tang in channel B reaches poppet of channel B. An electrical lock out energized by the first failure signal may be advantageously employed in the failure signal circuits to prevent a subsequent signal from the other channel from reaching the pilot.

In order to prevent the polarity reference lever from shifting the tangs 140 and 141 an excessive amount and thereby greatly shift the load tolerances from which error signals are normally derived when three channels are operating simultaneously, the slot 152 in the polarity reference lever 148 is curved to limit the translation of the lever in response to the displacement of the differential linkage 78'. Only a small shift is necessary to indicate a failure in one channel before the other.

With the incorporation of the polarity reference lever 148 in a redundant control system having three common control paths, it is possible to determine a first failure by a three-channel load comparison and a second failure by a two-channel load comparison and the polarity reference lever. It is therefore apparent that as long as any one of the actuators remains operative, the system can continue to operate and is not limited to a single failure detection as in earlier majority logic systems.

It should be understood that the invention is not limited to the particular embodiments shown and described herein, but that various changes and modifications may be made without departing from the spirit or scope of this novel concept as defined by the following claims.

We claim:
1. In a control system having at least two redundant control paths, the combination comprising:
(a) an actuator in each one of the control paths and having both active and inactive states, each actuator having an output member driven by a command signal which is common to each control path and an auxiliary element for generating a signal representative of the control load carried by the output member;
(b) a balanceable load-sharing linkage having an input connection from the auxiliary element of each of the actuators and having a balanced condition upon a preselected control load distribution on the output members of the actuators, the linkage further having an error output to at least one of the acutators for biasing the command signal in response to the deviation of the linkage from the unbalanced condition; and
(c) lock means operatively connected with each of the input connections to the load-sharing linkage from the auxiliary elements of the respective actuators for selectively fixing the load-sharing linkage in place at the input connection from one of the actuators during the inactive state of the one of the actuators.

2. Apparatus according to claim 1 wherein:
(a) the actuators are fluid actuators connected to a fluid power supply; and
(b) the lock means for the load-sharing linkage fixes the linkage at the input connection from one of the actuators in response to the absence of fluid power in the one of the actuators.

3. The combination of claim 1 wherein:
(a) the actuators are hydraulic acuators having a hydraulic power source; and
(b) the lock means includes a member movable with the input connection of one of the actuators and a hydraulically operated latch connected with the power source of the one of the actuators, the latch being engageable with the movable member to hold the member and input connection against movement and biased into engagement with the member upon a loss of hydraulic power from the one of the actuators.

4. The combination in a fluid actuator having a load-carrying output element for coacting operation in a redundant control system comprising:
(a) an input command member;
(b) a load-sharing command member having a resiliently biased center position;
(c) a load sensing member responsive to loads in the output element and operatively connected to the load-sharing command member;
(d) a feedback command member operatively connected with the output element;
(e) a fluid control valve for controlling the operation of the output element;
(f) a differential summing linkage connecting the input command member, the load-sharing command member and the feedback command member to the fluid control valve to drive the valve in response to the combined operation of the command members;

(g) a collapsible linkage operatively connecting the differential linkage with the control valve; and (h) load reacting means operatively associated with the collapsible linkage for collapsing the linkage at a preselected load for driving the valve.

5. The combination according to claim 4 wherein the preselected load is established by the design chip shearing force.

6. The combination according to claim 4 wherein:
 (a) the control valve generates fluid pressure differentials;
 (b) the output element is a fluid motor responsive to the fluid pressure differentials of the control valve;
 (c) a bypass valve is operably interposed between the control valve and the fluid motor, the bypass valve being operable between a first condition in which the pressure differentials are transmitted to the motor and a second condition in which the pressure differentials at the motor are neutralized; and
 (d) the collapsible linkage is operatively connected to the bypass valve and actuates the bypass valve from the first condition to the second condition upon the disengagement of the command members.

7. The combination of claim 4 further including:
 (a) a fluid power source having an active state in which fluid power is supplied to the actuator and an inactive state in which no fluid power is supplied to the actuator;
 (b) a lock operatively associated with the load-sharing command member and connected to the fluid power source, the lock being actuated by the fluid power source in the active state to an opened position in which the load-sharing member is free to operate the control valve of the actuator and biased toward a closed position in which the load-sharing command member is held fixed during the inactive state of the fluid power source.

8. A servo control mechanism having a plurality of redundant control paths comprising:
 (a) an actuator in each control path, each actuator including:
  (1) an input command member for transmitting to the actuator a command signal common to each of the control paths,
  (2) a load-sharing command member for transmitting to the actuator an error signal,
  (3) differential means connected with the members for combining the command signal and the error signal,
  (4) an output element responsive to the differential means and connected for parallel operation with the output elements in the other control paths,
  (5) a load transducer having a movable output member for producing a force proportional to the load carried by the output element of the actuator,
  (6) a lock operatively associated with the load transducer and having an engaged position for restraining the output member of the load transducer and including means for operatively disengaging the transducer during operation of the output element of the actuator by the differential means,
 (b) a balanceable load-sharing linkage connected to each of the movable output members of the load transducers and having a balanced condition for a preselected load distribution on the output elements of the actuators, the linkage also being connected to each load-sharing command member to generate the error signals upon deviations of the linkage from the balanced condition.

9. The servo control mechanism of claim 8 having at least three redundant control paths wherein:
 (a) the output element of each actuator includes a piston and a cylinder assembly;
 (b) a source of fluid having a prescribed supply pressure is connected through the differential means to the piston and cylinder assemblies of the actuators; and
 (c) failure detection means are connected to the piston and cylinder assemblies, the detection means being responsive to the pressures in the assemblies and generating a failure signal at a pressure equal to the supply pressure of the source plus a preselected pressure tolerance.

10. Apparatus according to claim 9 wherein:
 pressure relief means are connected to the piston and cylinder assemblies for discharging the assemblies at a prescribed pressure no less than the pressure at which the failure signal is provided by failure detection means.

11. The servo mechanism of claim 8 wherein each actuator further includes a failure detection means operatively connected with the load-sharing command member, the failure detection means generating a failure signal at a preselected error signal transmitted by the load-sharing command member.

12. The servo mechanism of claim 11 wherein each actuator includes:
 (a) a pressure actuated piston and cylinder assembly connected to operate the output element;
 (b) a bypass valve communicating with each end of the cylinder and having an open position equalizing the pressures in the cylinder, and a closed position isolating the pressures in each end of the cylinder; and
 (c) means for actuating the bypass valve from the closed position to the open position in response to the failure signal of the failure detection means.

13. Apparatus of claim 11 wherein each actuator includes a polarity reference means operatively connected between the input command member and the failure detection means for biasing the preselected error signal at which the failure signal is generated in phase relationship with the command signal.

14. Apparatus according to claim 4 wherein the load reacting means also includes means for resetting the collapsible linkage in connecting relationship with the differential linkage and the valve.

References Cited

UNITED STATES PATENTS

| | | |
|---|---|---|
| 2,597,419 | 5/1952 | Westbury et al. |
| 2,686,285 | 8/1954 | Meredith et al. ____ 244—78 XR |
| 3,136,504 | 6/1964 | Carr _____ 244—78 XR |
| 3,138,002 | 6/1964 | Ernst et al. |
| 3,190,185 | 6/1965 | Rasmussen. |
| 3,286,600 | 11/1966 | Colburn _____ 91—1 XR |
| 3,358,565 | 12/1967 | Townsend _____ 91—411 |

EDGAR W. GEOGHEGAN, Primary Examiner

U.S. Cl. X.R.

91—1, 363; 244—77, 78